(12) United States Patent  
Kusaka et al.

(10) Patent No.: US 7,011,450 B2  
(45) Date of Patent: Mar. 14, 2006

(54) FLUID DYNAMIC BEARING DEVICE AND MOTOR INCLUDING THE DEVICE

(75) Inventors: Keigo Kusaka, Ozu (JP); Daisuke Itou, Neyagawa (JP); Hiroaki Saito, Takatsuki (JP); Takafumi Asada, Hirakata (JP); Yasuhiro Asaida, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 188 days.

(21) Appl. No.: 10/724,046

(22) Filed: Dec. 1, 2003

(65) Prior Publication Data

US 2004/0161182 A1 Aug. 19, 2004

(30) Foreign Application Priority Data

Dec. 2, 2002 (JP) ............................. 2002-349691  
Dec. 6, 2002 (JP) ............................. 2002-355157

(51) Int. Cl.  
*F16C 32/06* (2006.01)

(52) U.S. Cl. ........................ 384/107; 384/112; 384/113

(58) Field of Classification Search ................ 384/100, 384/107, 111, 112, 113; 360/99.08, 98.07; 310/90  
See application file for complete search history.

(56) References Cited

U.S. PATENT DOCUMENTS

| 5,120,139 | A | * | 6/1992 | Asada et al. ................. 384/107 |
| 5,273,368 | A | * | 12/1993 | Asada et al. ................. 384/113 |
| 5,822,846 | A | * | 10/1998 | Moritan et al. ........... 360/99.08 |
| 5,993,066 | A | * | 11/1999 | Leuthold et al. ............. 384/113 |
| 6,072,660 | A | * | 6/2000 | Teshima ................... 360/99.08 |
| 6,361,214 | B1 | * | 3/2002 | Ichiyama .................... 384/107 |
| 6,364,532 | B1 | * | 4/2002 | Yoshikawa et al. .......... 384/107 |

FOREIGN PATENT DOCUMENTS

| JP | 58-024616 | 2/1983 |
| JP | 59-043216 | 3/1984 |

* cited by examiner

*Primary Examiner*—Thomas R. Hannon  
(74) *Attorney, Agent, or Firm*—Wenderoth, Lind & Ponack, L.L.P.

(57) ABSTRACT

A fluid dynamic bearing device including a shaft having an interior pressure regulating hole by which a center portion of a thrust surface confronting a thrust plate and a lubricant pool portion of an inner circumferential surface of a sleeve are communicated with each other. Thus, the device is capable of obtaining stable thrust floating characteristics and preventing leaks of the lubricant as well as exhaustion of the lubricant.

11 Claims, 6 Drawing Sheets

FLUID DYNAMIC BEARING DEVICE AND MOTOR INCLUDING THE DEVICE

BACKGROUND OF THE INVENTION

The present invention relates to a fluid dynamic bearing device free from occurrence of leaks of lubricant and stable in floating characteristics or stable thrust floating characteristics against temperature changes of the working environment of the bearing device, and also to a motor to be used for disk recording devices that perform recording and reproduction of signals derived from a rotary magnetic disk equipped with the fluid dynamic bearing device.

Figure 6:
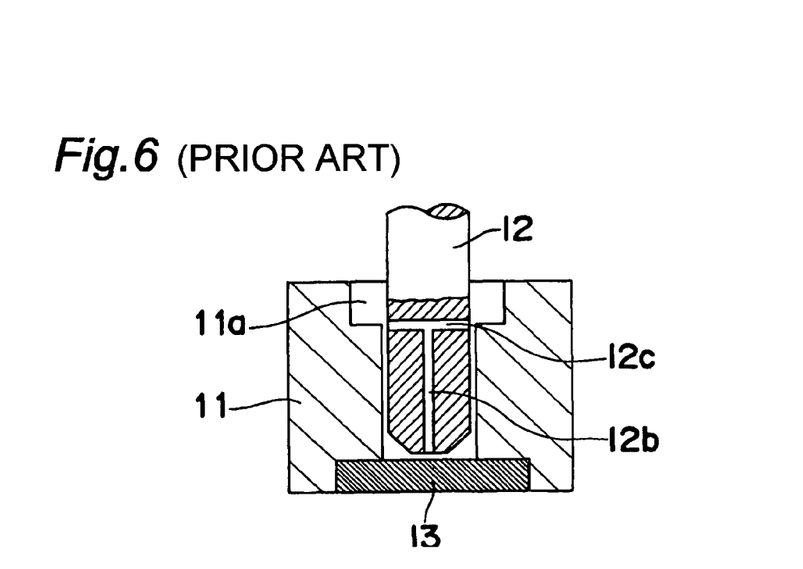
FIG. 6 is a sectional view of a prior art fluid dynamic bearing.

FIG. 6 is a sectional view of a prior art example of the fluid dynamic bearing.

In this fluid dynamic bearing, a thrust plate 13 for closing a cylindrical hole is fixed at a lower end face of a sleeve 11, and a rotatable shaft 12 is inserted into the cylindrical hole.

An opening portion of the cylindrical hole is formed as a large-diameter hole 11a that is larger in diameter than the cylindrical hole.

Figure 7:
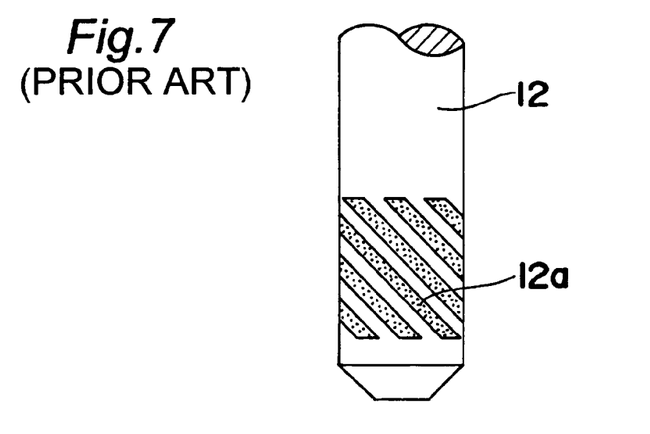
FIG. 7 is a detailed view of a dynamic pressure generating groove at the outer circumferential surface of the shaft shown in FIG. 6.

On the outer circumferential surface of the shaft 12, a spiral-shaped dynamic pressure generating groove 12a is provided as shown in FIG. 7 in opposition to the inner circumferential surface of the cylindrical hole of the sleeve 11.

The dynamic pressure generating groove 12a performs an action of making the lubricant within a clearance between the shaft 12 and the sleeve 11 flow toward the thrust plate 13 during the operation of the bearing, i.e., during the rotation of at least one of the shaft 12 and the sleeve 11.

A circulation hole 12b is provided along the axial direction at a center portion of an end face of the shaft 12 confronting the thrust plate 13. Also, the shaft 12 is provided with a communication hole 12c that communicates with the large-diameter hole 11a from the circulation hole 12b during the operation of the shaft 12 (see, e.g., Japanese Unexamined Patent Publication No. 58-24616).

With the construction as shown above, the shaft 12, while at rest, has its one end face kept in contact with the thrust plate 13. When the shaft 12 is rotated, the lubricant within the large-diameter hole 11a is induced to flow toward the thrust plate 13 by a pumping action of the spiral-shaped dynamic pressure generating groove 12a, thereby making the shaft 12 float. As the shaft 12 is floated, the lubricant flows out through the circulation hole 12b and the communication hole 12c into the large-diameter hole 11a. Since the pressure between the thrust plate 13 and the one end face of the shaft 12 is adjusted by changes in the floating quantity of the shaft 12, stable floating characteristics can be obtained.

However, with such a construction as described above, there has been a serious drawback that when vibrations or shocks are applied in the axial direction, the lubricant flowing out to the large-diameter hole 11a provided at the opening of the sleeve 11 would be leaked outside the bearing, causing the lubricant to be exhausted.

Figure 12:
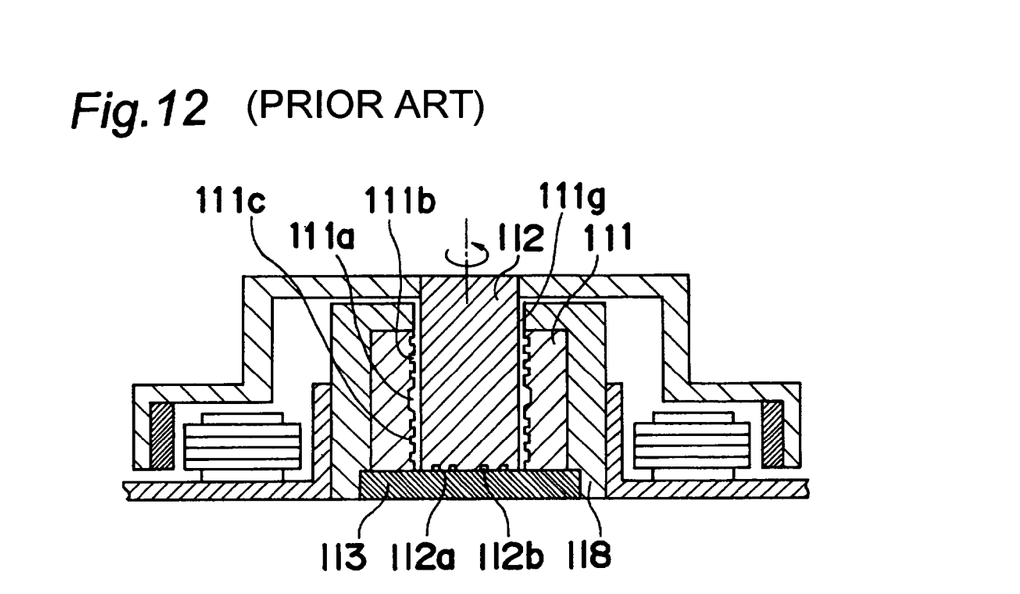
FIG. 12 is a sectional view of a prior art fluid dynamic bearing.

FIG. 12 is a sectional view of a prior art example of a fluid dynamic bearing.

In this fluid dynamic bearing, a thrust plate 113 for closing a cylindrical hole 11g of a sleeve 111 is fixed at a lower end face of a sleeve holder 118 that surrounds the sleeve 111, and a rotatable shaft 112 is inserted into the cylindrical hole 111g.

Figure 13:
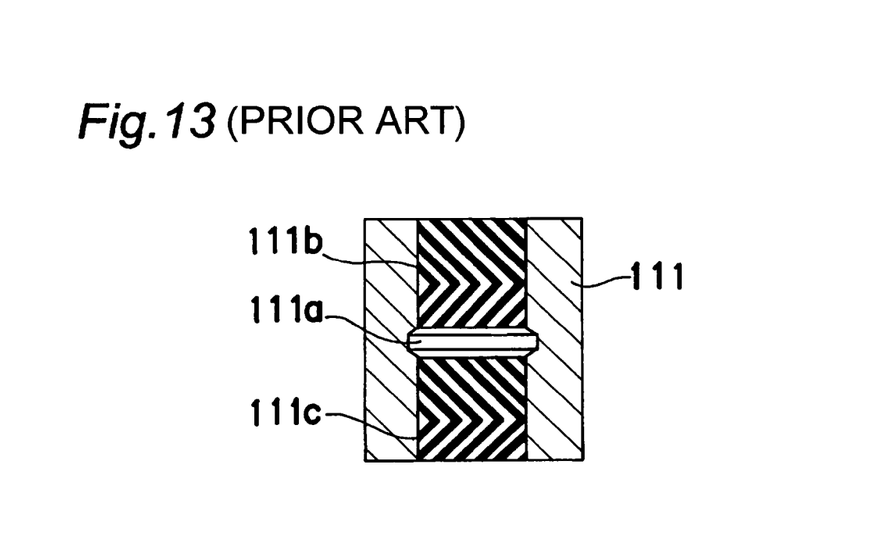
FIG. 13 is a detailed view of a cross section of the sleeve shown in FIG. 12.

On the inner circumferential surface of the cylindrical hole 111g of the sleeve 111, asymmetrical herringbone-shaped dynamic pressure generating grooves 111b, 111c are provided as shown in FIG. 13 in opposition to the outer circumferential surface of the shaft 112.

Also, a spiral- or herringbone-shaped dynamic pressure generating groove 112b is provided on a thrust surface 112a confronting the thrust plate 113 of the lower end face of the shaft 112.

The dynamic pressure generating grooves 111b, 111c perform an action of making the lubricant within a clearance between the shaft 112 and the sleeve 111 flow toward the thrust plate 113 during the operation of the bearing, i.e., during the rotation of at least one of the shaft 112 and the sleeve 111.

With the construction as shown above, the shaft 112, while at rest, has its one end face kept in contact with the thrust plate 113. When the shaft 112 is rotated, an axially supporting force is generated by a pumping action of the dynamic pressure generating groove 112b of the thrust surface of the shaft 112, and moreover the lubricant within the clearance between the shaft 112 and the sleeve 111 is induced to flow toward the thrust plate 113 by a pumping action of the asymmetrical herringbone-shaped dynamic pressure generating grooves 111b, 111c of the inner circumferential surface of the sleeve 111, thereby making the shaft 112 float. Thus, under predetermined working environments, a specified thrust floating amount can be obtained (See, e.g. Japanese Unexamined Patent Publication No. 59-43216).

However, with such a construction as described above, there has been a serious drawback that the viscosity of the lubricant within the bearing would change due to temperature changes of the working environment (performance-guarantee temperature range for general bearing devices: −10 to 70° C.), so that the floating amount of the shaft would become lower than a specified value because of a decrease in the viscosity of the lubricant under high temperatures, while the floating amount of the shaft would become larger than a specified value because of an increase in the viscosity of the lubricant under low temperatures.

SUMMARY OF THE INVENTION

Accordingly, with the above drawback taken into consideration, an object of the present invention is to provide a high-reliability fluid dynamic bearing device, as well as a motor including the fluid dynamic bearing device, which can exhibit stable floating characteristics.

Specifically, with the above drawback taken into consideration, an object of the present invention is to provide a high-reliability fluid dynamic bearing device, as well as a motor including the fluid dynamic bearing device, which is free from occurrence of leaks of the lubricant and which exhibits stable floating characteristics even when axial vibrations or shocks are applied.

Accordingly, with the above drawback taken into consideration, an object of the present invention is to provide a high-reliability fluid dynamic bearing device, as well as a motor including the fluid dynamic bearing device, which exhibits stable floating characteristics even when the temperature of the working environment of the bearing device has changed.

According to a first aspect of the present invention, there is provided a fluid dynamic bearing device comprising:
 a sleeve having a bearing hole;
 a shaft relatively rotatably inserted into the bearing hole; and
 a thrust bearing member fixed to an end face of the sleeve and making contact with one end face of the shaft, wherein a thrust-side dynamic pressure generating groove is provided at at least one of the one end face of the shaft and the thrust bearing member, at least two radial-side dynamic pressure generating grooves for performing an action of making a lubricant flow to the thrust bearing member are provided at at least one of an inner circumferential surface of the bearing hole of the sleeve and an outer circumferential surface of the shaft, and a lubricant pool portion being larger than a clearance between the sleeve and the shaft in the two dynamic pressure generating grooves and not confronting outside is provided in a middle of the two dynamic pressure generating grooves, and a pressure regulating hole is provided at a central portion of an end face of the shaft confronting the thrust bearing member and communicates with the lubricant pool portion.

By the above construction of the first aspect of the present invention, the fluid dynamic bearing device is capable of obtaining stable thrust floating characteristics, and moreover preventing the occurrence of exhaustion of the lubricant within the bearing due to outward leaks of the lubricant from within the bearing even when axial vibrations or shocks are applied thereto.

According to a second aspect of the present invention, there is provided a fluid dynamic bearing device comprising:
a sleeve having a bearing hole;
a shaft relatively rotatably inserted into the bearing hole; and
a thrust bearing member fixed to an end face of the sleeve and making contact with one end face of the shaft,
wherein a thrust-side dynamic pressure generating groove is provided at at least one of the one end face of the shaft and the thrust bearing member, at least two radial-side dynamic pressure generating grooves for performing an action of making a lubricant flow to the thrust bearing member are provided at at least one of an inner circumferential surface of the bearing hole of the sleeve and an outer circumferential surface of the shaft, and a lubricant pool portion being larger than a clearance between the sleeve and the shaft in the two dynamic pressure generating grooves and not confronting outside is provided in a middle of the two dynamic pressure generating grooves, and a pressure regulating hole is provided at an outer-circumference neighborhood portion of the thrust-side dynamic pressure generating groove of an end face of the shaft confronting the thrust bearing member and communicates with the lubricant pool portion.

By the above construction of the second aspect of the present invention, the fluid dynamic bearing device is capable of obtaining stable thrust floating characteristics, and moreover preventing occurrence of exhaustion of the lubricant within the bearing due to outward leaks of the lubricant from within the bearing even when axial vibrations or shocks are applied thereto. In addition, a peak portion of thrust pressure distribution in the central portion of the end face of the shaft confronting the thrust bearing member can be effectively utilized, so that the device can be designed compact.

It is noted that the fluid dynamic bearing device of the present invention can be applied for various types of mechanical equipment in addition to motors.

According to a fifth aspect of the present invention, there is provided a motor including the fluid dynamic bearing device as defined in the first aspect, wherein the pressure regulating hole is provided so that the lubricant of the lubricant pool portion is moved toward the thrust plate by the dynamic pressure generating groove lower than the lubricant pool portion so as to be moved to a central portion of a thrust surface of the shaft, then passing through the pressure regulating hole provided within the shaft to return to the original position.

According to a sixth aspect of the present invention, there is provided a motor including the fluid dynamic bearing device as defined in the second aspect, wherein the pressure regulating hole is provided so that the lubricant of the lubricant pool portion is made to flow toward the thrust plate by the asymmetrical dynamic pressure generating groove lower than the lubricant pool portion, so as to move up to the outer-circumference neighborhood portion of the dynamic pressure generating groove of the thrust surface of the shaft, passing through the pressure regulating hole provided within the shaft to return to the original position.

The motor of the present invention includes the above-defined fluid dynamic bearing device, in which the shaft or the sleeve is rotated as a part of the rotor. This motor can be used as a spindle motor for use in drive units for recording mediums such as hard disks or other magnetic disks, magneto-optical disks, CDs, DVDs, or other optical disks.

According to a seventh aspect of the present invention, there is provided a fluid dynamic bearing device comprising:
a sleeve having a bearing hole;
a shaft relatively rotatably inserted into the bearing hole;
a sleeve holder surrounding the sleeve; and
a thrust bearing member fixed to an end face of the sleeve holder and making contact with one end face of the shaft,
wherein a thrust-side dynamic pressure generating groove is provided at at least one of the one end face of the shaft and the thrust bearing member, at least two radial-side dynamic pressure generating grooves for performing an action of making a lubricant flow to the thrust bearing member are provided at at least one of an inner circumferential surface of the bearing hole of the sleeve and an outer circumferential surface of the shaft, and a lubricant pool portion being larger than a clearance between the sleeve and the shaft in the two dynamic pressure generating grooves and not confronting outside is provided in a middle of the two dynamic pressure generating grooves, a narrow gap portion is provided between the sleeve and the thrust bearing member; and a pressure regulating hole is provided in an end face of the sleeve confronting the thrust bearing member and which communicates with the lubricant pool portion, and the sleeve holder is made of a material smaller in linear expansion coefficient than the sleeve.

According to an eighth aspect of the present invention, there is provided a fluid dynamic bearing device according to the seventh aspect, wherein an axial length of the sleeve is set to not more than 20 mm, a clearance of the narrow gap portion is sized to 1/500 to 1/1000, compared with the axial length of the sleeve, and a difference in linear expansion coefficient between a material of the sleeve and the material of the sleeve holder is set to $5.0 \times 10^{-6}$ to $10.0 \times 10^{-6}$.

According to a ninth aspect of the present invention, there is provided a motor including the fluid dynamic bearing device as defined in the seventh aspect, wherein the sleeve or the shaft is rotated as part of a rotor.

According to a 10th aspect of the present invention, there is provided a motor including the fluid dynamic bearing device as defined in the eighth aspect, wherein the sleeve or the shaft is rotated as part of a rotor.

According to an 11th aspect of the present invention, there is provided a motor including the fluid dynamic bearing device, as defined in the eighth aspect, wherein when a temperature of working environment of the fluid dynamic bearing device is changed, the narrow gap for adjusting the thrust pressure is changed by a difference in linear expansion coefficient between the sleeve and the sleeve holder in such a direction that a thrust floating amount is adjusted, in response to changes in thrust pressure due to increases and decreases of a viscosity of the lubricant.

By the above construction of the aspects of the present invention, even when the temperature of the working environment has changed, the narrow gap that adjusts the thrust pressure is changed by the difference in linear expansion coefficient between the sleeve and the sleeve holder in such a direction that the thrust floating amount is stabilized, and the fluid dynamic bearing device is capable of obtained stable floating characteristics.

It is noted that the fluid dynamic bearing device of the present invention can be applied for various types of mechanical equipment in addition to motors.

The motor of the present invention includes the above-defined fluid dynamic bearing device, in which the shaft or the sleeve is rotated as a part of the rotor. This motor can be used as a spindle motor for use in drive units for recording mediums such as hard disks or other magnetic disks, magneto-optical disks, CDs, DVDs, or other optical disks.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Before the description of the present invention proceeds, it is to be noted that like parts are designated by like reference numerals throughout the accompanying drawings.

Embodiments of the present invention are described below with reference to FIGS. 1 to 5B.

Figure 1:
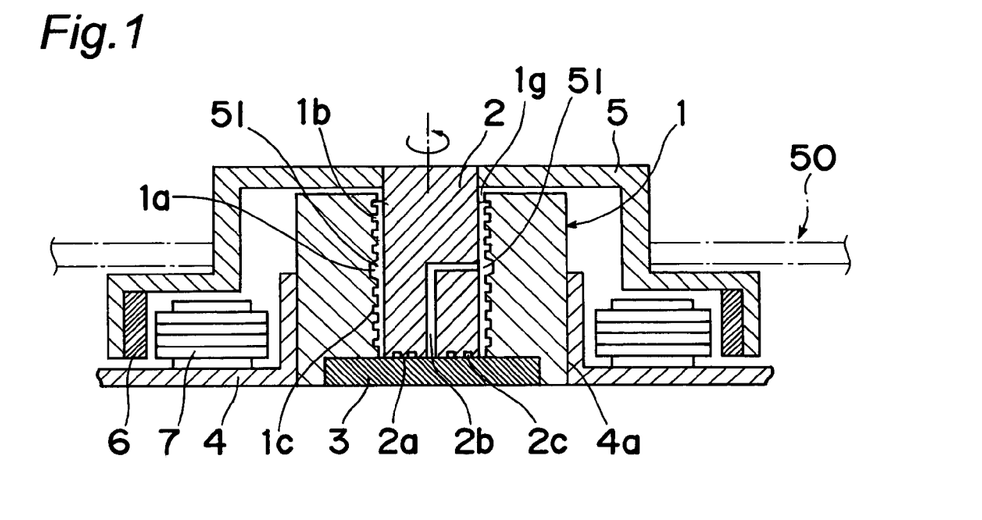
FIG. 1 is a schematic sectional view of a spindle motor dedicated to hard disk drive use and equipped with a fluid dynamic bearing device according to a first embodiment of the present invention.
Figure 2:
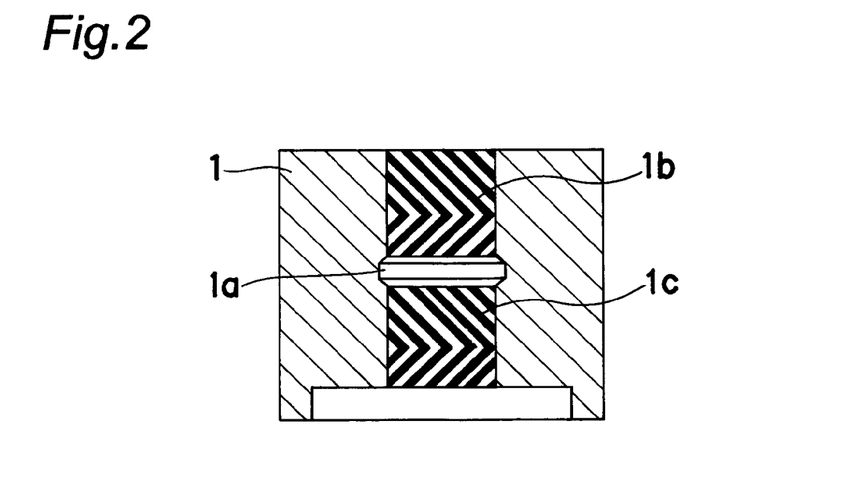
FIG. 2 is a detailed view of a dynamic pressure generating groove of the inner circumferential surface of the sleeve shown in FIG. 1.
Figure 3A:
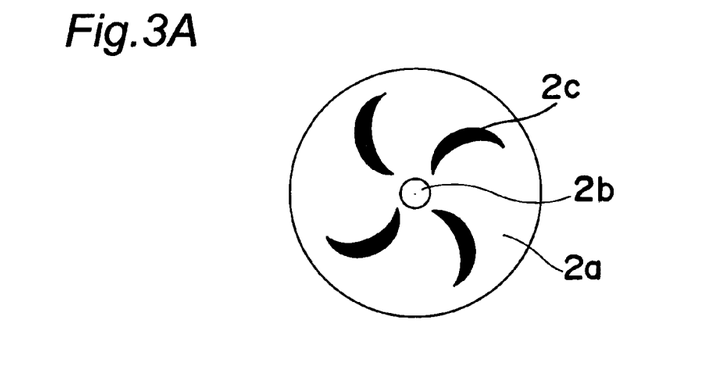
FIG. 3A is a detailed view of a thrust bearing surface shown in FIG. 1.
Figure 3B:
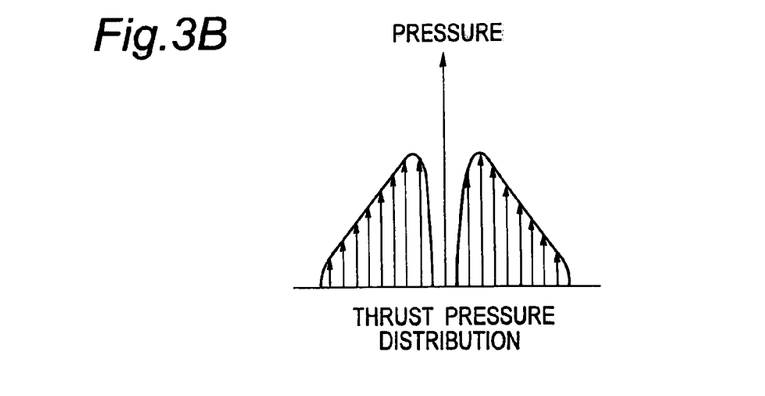
FIG. 3B is an explanatory view of thrust pressure distribution.

FIGS. 1 to 3B are concerned with a spindle motor for hard disk drive use and equipped with a fluid dynamic bearing device as described in the first embodiment of the present invention. Among those drawings, FIG. 2 is a detailed view of a dynamic pressure generating groove of the inner circumferential surface of the sleeve, FIG. 3A is a detailed view of a thrust bearing surface, and FIG. 3B is an explanatory view of thrust pressure distribution.

As shown in FIG. 1, a lower end face of a generally cylindrical-shaped sleeve 1 is fitted and fixed to a fitting hole 4a of a base 4 of the spindle motor by, for example, press fit, laser welding, adhesion with an adhesive, or the like, by which the sleeve 1 is fixed.

In the sleeve 1, a shaft 2 whose upper end portion is fixed to a central portion of a bowl-shaped rotor hub 5 and which is inwardly protruding is rotatably inserted into a cylindrical hole 1g, and a thrust plate 3 that closes the cylindrical hole 1g is fixed to the lower end portion of the sleeve 1.

A cylindrical-shaped rotor magnet 6 is internally fitted and fixed to the inner circumferential surface of the outer circumferential wall of the rotor hub 5 so as to confront a stator core 7 with a radial gap therebetween. A hard disk 50 is externally fitted and held on the outer circumferential surface of the outer circumferential wall of the rotor hub 5.

The clearance between the sleeve 1 as well as the thrust plate 3 and the shaft 2 is filled with a lubricant, and these members constitute the fluid dynamic bearing device.

At the lower end face of the shaft 2, a thrust surface 2a vertical to the axial center direction is formed so as to confront the upper face of the thrust plate 3 along the axial direction with the lubricant therebetween, thus constituting a thrust bearing portion.

An annular recessed lubricant pool portion 1a is formed at a vertically intermediate portion of the circumference of the sleeve 1.

The upper-and-lower inner circumferential surfaces of the lubricant pool portion 1a of the sleeve 1 and the outer circumferential surface of the shaft 2 confront each other along the radial direction via the lubricant, thereby constituting upper-and-lower radial bearing portions. At inner circumferential portions of the sleeve 1 in the upper and lower radial bearing portions are provided asymmetrical dynamic pressure generating grooves 1b, 1c for making the lubricant flow toward the thrust plate 3 during the rotation of the shaft 2.

Also, inside the shaft 2 is provided an L-bent pressure regulating hole 2b by which a center portion of the thrust surface 2a confronting the thrust plate 3 and the lubricant pool portion 1a of the inner circumferential surface of the sleeve 1 are communicated with each other.

With the construction as shown above, the thrust surface 2a of the lowest end face of the shaft 2, while at rest, is kept in contact with the thrust plate 3. When the shaft 2 is rotated, the lubricant 51 within the lubricant pool portion 1a is induced to flow toward the thrust plate 13 by a pumping action of an asymmetrical herringbone-shaped dynamic pressure generating groove 2c as shown in FIG. 3A, thereby making the shaft 2 float. As the shaft 2 is floated, the lubricant 51 circulates through the pressure regulating hole 2b to the lubricant pool portion 1a. Since the pressure between the thrust plate 3 and the thrust surface 2a of the lower end face of the shaft 2 is adjusted by changes in the floating quantity of the shaft 2, stable floating characteristics can be obtained by the thrust pressure shown in FIG. 3B. In addition, when axial vibrations or shocks are applied to the bearing device, the lubricant 51 is kept in the gap between the sleeve 1 and the shaft 2 by surface tension (capillarity) of the lubricant 51 during a halt of the shaft 2, and does not leak outside the bearing. Also, during the rotation of the shaft 2, the lubricant 51 is moved to the lubricant pool portion 1a by the asymmetrical dynamic pressure generating groove 1b, which is above the lubricant pool portion 1a, thereby providing a sealing action exerted so that the lubricant 51 is prevented from leaking outside the bearing.

The lubricant 51 of the lubricant pool portion 1a is moved toward the thrust plate 3 by the asymmetrical dynamic pressure generating groove 1c, which is lower than the lubricant pool portion 1a so as to be moved to the central portion of the thrust surface 2a of the shaft 2. The lubricant then passes through the pressure regulating hole 2b provided within the shaft 2 to return to the original position. Thus, exhaustion of the lubricant 51 within the bearing due to leaks of the lubricant 51 can be prevented.

Figure 4:
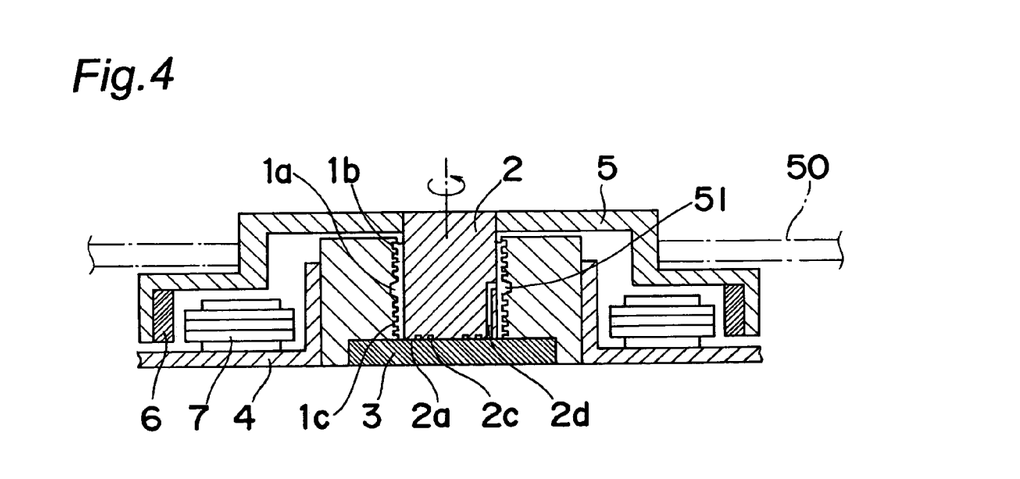
FIG. 4 is a schematic sectional view of a spindle motor dedicated to hard disk drive use and equipped with a fluid dynamic bearing device according to a second embodiment of the present invention.
Figure 5A:
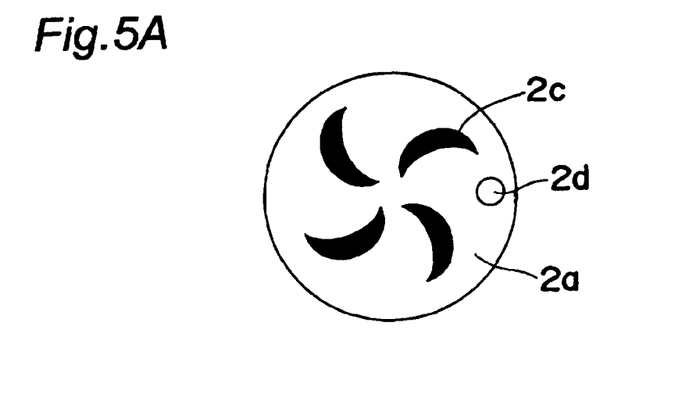
FIG. 5A is a detailed view of a thrust bearing surface shown in FIG. 4.
Figure 5B:
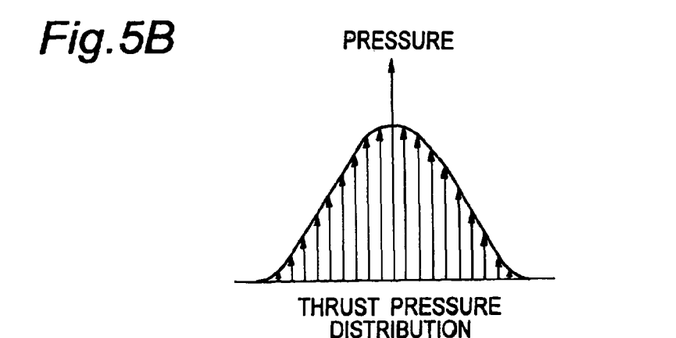
FIG. 5B is an explanatory view of thrust pressure distribution.

In a fluid dynamic bearing device according to a second embodiment of the present invention, as shown in FIG. 4, a pressure regulating hole 2d by which an outer-circumference neighborhood portion of the dynamic pressure generating groove 2c of the thrust surface 2a confronting the thrust plate 3, and the lubricant pool portion 1a of the inner circumferential surface of the sleeve 1, are communicated with each other is provided inside the shaft 2. While the shaft 2 is at rest, the thrust surface 2a of the lower end face of the shaft 2 and the thrust plate 3 are in contact with each other. When the shaft 2 is rotated, the lubricant 51 within the lubricant pool portion 1a is induced to flow toward the thrust plate 3 by a pumping action of the asymmetrical herringbone-shaped dynamic pressure generating groove 2c as shown in FIG. 5A, thereby causing the shaft 2 to float. As the shaft 2 is floated, the lubricant 51 circulates through the pressure regulating hole 2d to the lubricant pool portion 1a. Since the pressure between the thrust plate 3 and the thrust surface 2a of the lower end face of the shaft 2 is adjusted by changes in the floating quantity of the shaft 2, stable floating characteristics can be obtained. In addition, when axial vibrations or shocks are applied to the bearing device, the lubricant 51 is kept in the gap between the sleeve 1 and the shaft 2 by surface tension (capillary phenomenon) of the lubricant 51 during a halt of the shaft 2, and does not leak outside the bearing. Also, during the rotation of the shaft 2, the lubricant 51 is moved to the lubricant pool portion 1a by the asymmetrical dynamic pressure generating groove 1b, which is above the lubricant pool portion 1a, thereby providing a sealing action exerted so that the lubricant is prevented from leaking outside the bearing.

The lubricant 51 of the lubricant pool portion 1a is made to flow toward the thrust plate 3 by the asymmetrical dynamic pressure generating groove 1c, which is lower than the lubricant pool portion 1a, so as to move up to the outer-circumference neighborhood portion of the dynamic pressure generating groove 2c of the thrust surface 2a of the shaft 2, passing through the pressure regulating hole 2d provided within the shaft 2 to return to the original position. Thus, exhaustion of the lubricant 51 within the bearing due to leaks of the lubricant 51 can be prevented, and moreover a maximum-pressure portion of the central portion of the thrust surface 2a can be effectively utilized for the floating depending on the thrust pressure distribution shown by FIG. 5B, so that the fluid dynamic bearing device as well as the spindle motor can be made compact.

In the embodiments, it is noted that the dynamic pressure generating groove 2c provided at the thrust surface 2a of the lower face of the shaft 2 may also be provided in the confronting surface of the thrust plate 3.

Further, in the embodiments, the pressure regulating hole 2b, 2d provided inside the shaft 2 and communicating with the lubricant pool portion 1a of the inner circumferential surface of the sleeve 1 may also be provided two or more in number.

Likewise, the pressure regulating hole 2d, which is provided inside the shaft 2 and by which the lubricant pool portion 1a of the inner circumferential surface of the sleeve 1 and the outer-circumference neighborhood portion of the dynamic pressure generating groove 2c of the thrust surface 2a confronting the thrust plate 3 are communicated with each other, may also be provided two or more in number.

Vertical or up-down positional relations in the foregoing description of the embodiments are given only for explanation's sake based on the accompanying drawings, and do not limit the actual state of use or the like.

According to the fluid dynamic bearing device and motor of the present invention, since the pressure regulating hole by which the center portion of the thrust surface confronting the thrust plate and the lubricant pool portion of the inner circumferential surface of the sleeve are communicated with each other is provided inside the shaft, stable floating characteristics can be obtained and moreover, when axial vibrations or shocks are applied, leaks of the lubricant outward of the bearing, as well as exhaustion of the lubricant within the bearing, can be prevented.

Further, by the provision of a pressure regulating hole which communicates with the lubricant pool portion of the inner circumferential surface of the sleeve within the shaft is provided at the outer-circumference neighborhood portion of the dynamic pressure generating groove of the thrust surface confronting the thrust plate, the maximum-pressure portion of the central portion of the thrust surface can be effectively utilized for the floating, so that the fluid dynamic bearing device as well as the spindle motor can be made compact.

Figure 8:
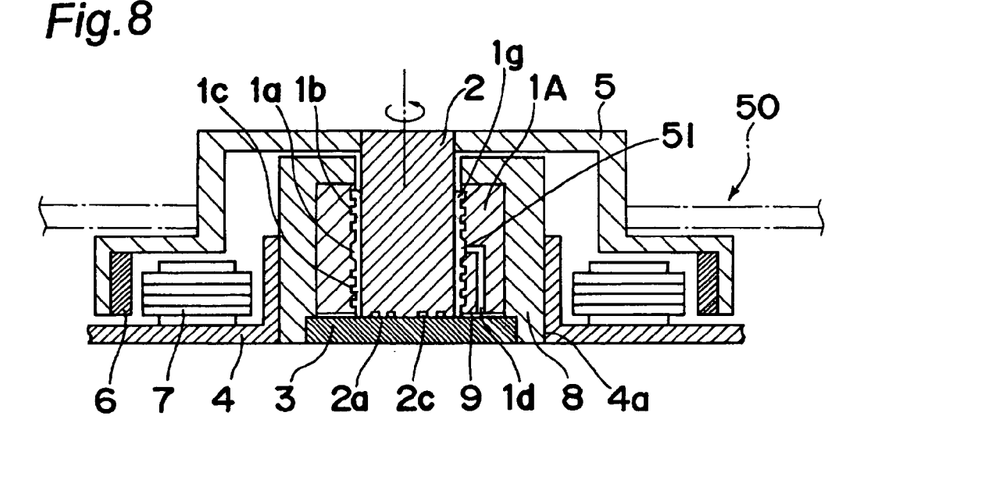
FIG. 8 is a schematic sectional view of a spindle motor dedicated to hard disk drive use and equipped with a fluid dynamic bearing device according to a third embodiment of the present invention.
Figure 9:
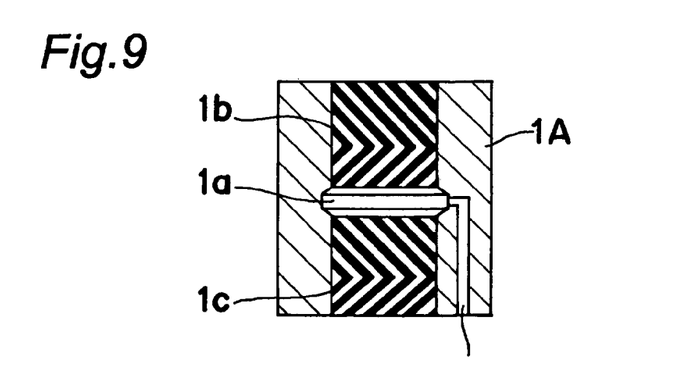
FIG. 9 is a detailed view of a cross section of the sleeve shown in FIG. 8.
Figure 10:
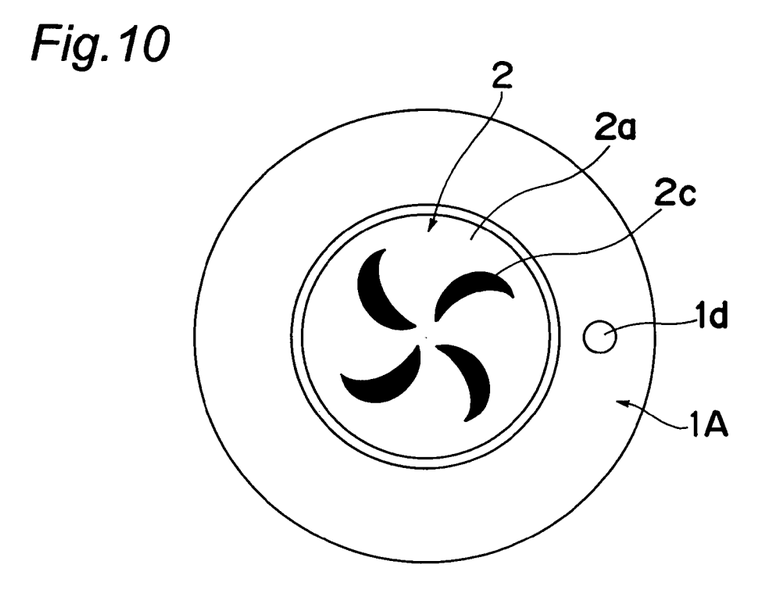
FIG. 10 is a detailed view of a thrust bearing surface shown in FIG. 8.

FIGS. 8 to 11 are concerned with a spindle motor dedicated to hard disk drive use and equipped with a fluid dynamic bearing device showing a third embodiment of the present invention. Among those drawings, FIG. 9 is a detailed view of a cross section of a sleeve, and FIG. 10 is a detailed view of a thrust bearing surface.

As shown in FIG. 8, a lower end face of a sleeve holder 8 that surrounds a generally cylindrical-shaped sleeve 1A is fitted and fixed to a fitting hole 4a of a base 4 of the spindle motor by, for example, press fit, laser welding, adhesion with an adhesive, or the like, by which the sleeve holder 8 is fixed.

In the sleeve 1A, a shaft 2 whose upper end portion is fixed to a central portion of a bowl-shaped rotor hub 5 and which is inwardly protruding is rotatably inserted into a cylindrical hole 1g, and a thrust plate 3 that closes the cylindrical hole 1g is fixed to the lower end face of the sleeve holder 8 surrounding the sleeve 1A.

A cylindrical-shaped rotor magnet 6 is internally fitted and fixed to the inner circumferential surface of the outer circumferential wall of the rotor hub 5 so as to confront a stator core 7 with a radial gap therebetween. The rotor is composed of the shaft 2, the rotor hub 5, and the rotor magnet 6. A hard disk 50 is externally fitted and held on the outer circumferential surface of the outer circumferential wall of the rotor hub 5.

The clearance between the sleeve 1A as well as the thrust plate 3 and the shaft 2 is filled with a lubricant 51, and these members constitute the fluid dynamic bearing device.

At the lower end face of the shaft 2, a thrust surface 2a vertical to the axial center direction is formed so as to confront the upper face of the thrust plate 3 along the axial direction with the lubricant 51 therebetween, thus constituting a thrust bearing portion.

A dynamic pressure generating groove 2c, shown in FIG. 10, is provided on the thrust surface 2a of the shaft 2.

An annular recessed lubricant pool portion 1a is formed at a vertically intermediate portion of the circumference of the sleeve 1A.

The upper-and-lower inner circumferential surfaces of the lubricant pool portion 1a of the sleeve 1A and the outer circumferential surface of the shaft 2 confront each other along the radial direction via the lubricant 51, thereby constituting upper-and-lower radial bearing portions. At inner circumferential portions of the sleeve 1A in the upper and lower radial bearing portions, as shown in FIG. 9, are provided asymmetrical dynamic pressure generating grooves 1b, 1c for making the lubricant 51 flow toward the thrust plate 3 during the rotation of the shaft 2.

Also, inside the sleeve 1A is provided a pressure regulating hole 1d by which a lower end face of the sleeve 1A confronting the thrust plate 3 and the lubricant pool portion 1a of the inner circumferential surface of the sleeve 1A are communicated with each other.

The sleeve holder 8 is formed from a material having a linear expansion coefficient that is smaller than that of the sleeve 1A.

Figure 11:
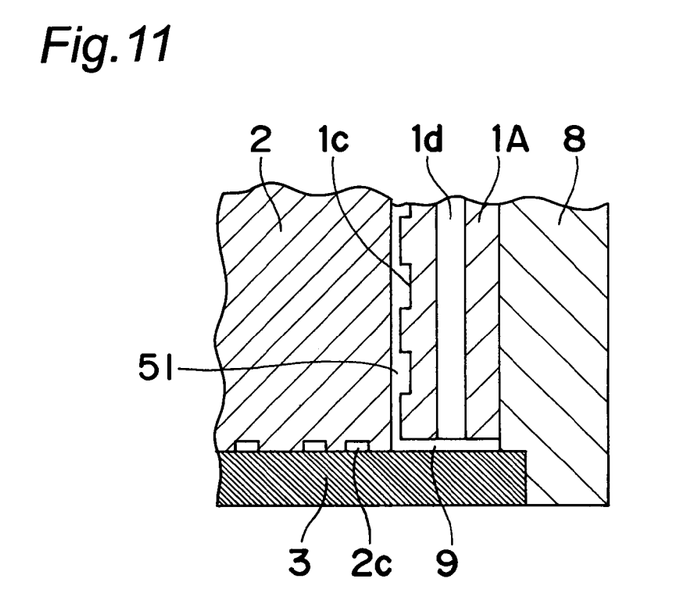
FIG. 11 is a detailed view of a neighborhood of a narrow gap between the lower end face of the sleeve and the thrust plate shown in FIG. 8.

It is noted that a narrow gap 9 is provided between the lower end face of the sleeve 1A and the thrust plate 3 as shown in FIG. 11.

In this case, the axial length of the sleeve 1A is set to not more than 20 mm, and the clearance of the narrow gap 9 is sized to 1/500 to 1/1000, compared with the axial length of the sleeve 1A. The difference in linear expansion coefficient between materials of the sleeve 1A and the sleeve holder 8 is set to $5.0 \times 10^{-6}$ to $10.0 \times 10^{-6}$. The set axial length is determined so as to perform the throttling effect within a practical temperature range by taking the difference in linear expansion coefficients therebetween into consideration. The set clearance of the narrow gap 9 is determined so as to perform the throttling effect within a practical temperature range. The set difference in linear expansion coefficient is determined so as to generate a narrow gap for performing the throttling effect within a practical temperature range by taking the axial length of the sleeve 1A into consideration.

With the construction as shown above, the shaft 2, while at rest, has its thrust surface 2a of the lower end face kept in contact with the thrust plate 3. When the shaft 2 is rotated, an axially supporting force is generated by a pumping action of the dynamic pressure generating groove 2c provided at the thrust surface of the shaft 2 as shown in FIG. 10, and moreover the lubricant 51 within the lubricant pool portion 1a is induced to flow toward the thrust plate 13 by a pumping action of the asymmetrical herringbone-shaped dynamic pressure generating grooves 2b, 2c provided at the inner circumferential surface of the sleeve 1A as shown in FIG. 9, thereby making the shaft 2 float. As the shaft 2 is floated, the lubricant 51 circulates through the pressure regulating hole 1d provided inside the sleeve 1A to the lubricant pool portion 1a. Since the pressure between the thrust plate 3 and the thrust surface 2a of the lower end face of the shaft 2 is adjusted by a throttling action of the narrow gap 9 between the lower end face of the sleeve 1A and the thrust plate 3, a specified thrust floating amount can be obtained.

In this case, even if the temperature of the working environment of the bearing device has changed, the narrow gap 9 that adjusts the thrust pressure is changed by the difference in linear expansion coefficient between the sleeve 1A and the sleeve holder 8 in such a direction that the thrust floating amount is adjusted, in response to changes in thrust pressure due to increases and decreases of the viscosity of the lubricant 51. Thus, stable floating characteristics can be obtained.

Also, since the thrust pressure decreases with the downsizing of the sleeve 1A, the clearance of the narrow gap 9 that adjusts the thrust pressure is preferably as small as possible, and moreover the extent of changes of the clearance of the narrow gap 9 in response to temperature changes of the working environment is preferably as large as possible.

That is, when the temperature of the working environment of the bearing device has increased, indeed the thrust pressure becomes smaller due to a decrease of the viscosity of the lubricant 51, but the size of the clearance of the narrow gap 9 becomes smaller, thereby increasing the throttling effect. Thus, any decrease of the thrust floating amount is suppressed, so that a specified floating amount can be obtained.

Conversely, when the temperature of the working environment of the bearing device has decreased, indeed the thrust pressure becomes larger due to an increase of the viscosity of the lubricant 51, but the size of the clearance of the narrow gap 9 becomes larger, thereby decreasing the throttling effect. Thus, any increase of the thrust floating amount is suppressed, so that a specified floating amount can be obtained.

In the third embodiment, by virtue of the arrangement that the axial length of the sleeve 1A is set to not more than 20 mm, the clearance of the narrow gap 9 is sized to 1/500 to 1/1000, compared with the axial length of the sleeve 1A, and that the difference in linear expansion coefficient between the materials of the sleeve 1A and the sleeve holder 8 is set to $5.0 \times 10^{-6}$ to $10.0 \times 10^{-6}$, the size of the clearance of the narrow gap 9 never becomes zero, and moreover the throttling effect works effectively, over a range of the performance-guarantee temperature range (−10 to 70° C.) of the bearing device.

As to the materials of the sleeve 1A and the sleeve holder 8, for example, a copper alloy C3604 in JIS (linear expansion coefficient: $18.4 \times 10^{-6}$) for the sleeve 1A, and a stainless alloy SUS420J2 in JIS (linear expansion coefficient: $10.3 \times 10^{-6}$) for the sleeve holder 8 may be adopted. Here, JIS means the Japanese Industrial Standard.

It is noted that in the third embodiment, the dynamic pressure generating groove 2c provided at the thrust surface 2a of the lower face of the shaft 2 may also be provided in the confronting surface of the thrust plate 3.

Further, in the third embodiment, the pressure regulating hole 1d, which is provided inside the sleeve 1A and by which the lubricant pool portion 1a of the inner circumferential surface of the sleeve 1A and the lower end face of the sleeve 1A confronting the thrust plate 3 are communicated with each other, may also be provided two or more in number.

Vertical or up-down positional relations in the foregoing description of the third embodiment are given only for explanation's sake based on the accompanying drawings, and do not limit the actual state of use or the like.

According to the fluid dynamic bearing device and motor of the present invention, since the pressure regulating hole by which the lower end face of the sleeve confronting the thrust plate and the lubricant pool portion of the inner circumferential surface of the sleeve are communicated with each other is provided inside the sleeve, and since the narrow gap is provided between the lower end face of the sleeve and the thrust plate, stable floating characteristics can be obtained even against temperature changes of the working environment.

Further, by the arrangement that the axial length of the sleeve is set to not more than 20 mm, the clearance of the narrow gap portion is sized to 1/500 to 1/1000, compared with the axial length of the sleeve, and that the difference in linear expansion coefficient between the materials of the sleeve and the sleeve holder is set to $5.0 \times 10^{-6}$ to $10.0 \times 10^{-6}$, the throttling effect works effectively in response to temperature changes, hence the device is practical and effective.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims unless they depart therefrom.

What is claimed is:

1. A fluid dynamic bearing device comprising:
   a sleeve having a bearing hole;
   a shaft relatively rotatably inserted into the bearing hole; and
   a thrust bearing member fixed to an end face of the sleeve and making contact with one end face of the shaft,
   wherein a thrust-side dynamic pressure generating groove is provided in at least one of the one end face of the shaft and the thrust bearing member,
   wherein at least two radial-side dynamic pressure generating grooves for performing an action of making a lubricant flow to the thrust bearing member are provided in at least one of an inner circumferential surface of the bearing hole of the sleeve and an outer circumferential surface of the shaft, and a lubricant pool portion, which is larger than a clearance between the sleeve and the shaft in the two dynamic pressure generating grooves and not confronting outside, is provided between the two dynamic pressure generating grooves, and
   wherein a pressure regulating hole is provided at a central portion of the one end face of the shaft confronting the thrust bearing member, and the pressure regulating hole communicates with the lubricant pool portion.

2. A motor including the fluid dynamic bearing device as defined in claim 1, wherein the sleeve or the shaft is rotated as part of a rotor.

3. A motor including the fluid dynamic bearing device as defined in claim 1, wherein the pressure regulating hole is provided so that the lubricant of the lubricant pool portion can be moved toward the thrust plate by the dynamic pressure generating groove that is lower than the lubricant pool portion so as to be moved to a central portion of a thrust surface of the shaft, and then pass through the pressure regulating hole provided within the shaft to return to the lubricant pool portion.

4. A fluid dynamic bearing device comprising:
   a sleeve having a bearing hole;
   a shaft relatively rotatably inserted into the bearing hole; and
   a thrust bearing member fixed to an end face of the sleeve and making contact with one end face of the shaft,
   wherein a thrust-side dynamic pressure generating groove is provided in at least one of the one end face of the shaft and the thrust bearing member,
   wherein at least two radial-side dynamic pressure generating grooves for performing an action of making a lubricant flow to the thrust bearing member are provided in at least one of an inner circumferential surface of the bearing hole of the sleeve and an outer circumferential surface of the shaft, and a lubricant pool portion, which is larger than a clearance between the sleeve and the shaft in the two dynamic pressure generating grooves and not confronting outside, is provided between the two dynamic pressure generating grooves, and
   wherein a pressure regulating hole is provided at an outer-circumference neighborhood portion of the thrust-side dynamic pressure generating groove of the one end face of the shaft confronting the thrust bearing member, and the pressure regulating hole communicates with the lubricant pool portion.

5. A motor including the fluid dynamic bearing device as defined in claim 4, wherein the sleeve or the shaft is rotated as part of a rotor.

6. A motor including the fluid dynamic bearing device as defined in claim 4, wherein the pressure regulating hole is provided so that the lubricant of the lubricant pool portion is made to flow toward the thrust plate by the dynamic pressure generating groove that is lower than the lubricant pool portion, so as to move to the outer-circumference neighborhood portion of the dynamic pressure generating groove of the one end face of the shaft, and pass through the pressure regulating hole provided within the shaft to return to the lubricant pool portion.

7. A fluid dynamic bearing device comprising:
   a sleeve having a bearing hole;
   a shaft relatively rotatably inserted into the bearing hole;
   a sleeve holder surrounding the sleeve; and
   a thrust bearing member fixed to an end face of the sleeve holder and making contact with one end face of the shaft,
   wherein a thrust-side dynamic pressure generating groove is provided in at least one of the one end face of the shaft and the thrust bearing member,
   wherein at least two radial-side dynamic pressure generating grooves for performing an action of making a lubricant flow to the thrust bearing member are provided in at least one of an inner circumferential surface of the bearing hole of the sleeve and an outer circumferential surface of the shaft,
   wherein a lubricant pool portion, which is larger than a clearance between the sleeve and the shaft in the two dynamic pressure generating grooves and does not confront outside, is provided between the two dynamic pressure generating grooves, wherein a narrow gap portion is provided between the sleeve and the thrust bearing member; and wherein a pressure regulating hole is provided in the one end face of the sleeve confronting the thrust bearing member, the pressure regulating hole communicates with the lubricant pool portion, and the sleeve holder is made of a material that is smaller in linear expansion coefficient than the sleeve.

8. A fluid dynamic bearing device according to claim 7, wherein an axial length of the sleeve is set to not more than 20 mm, a clearance of the narrow gap portion is sized to 1/500 to 1/1000, compared with the axial length of the sleeve, and a difference in linear expansion coefficient between a material of the sleeve and the material of the sleeve holder is set to $5.0 \times 10^{-6}$ to $10.0 \times 10^{-6}$.

9. A motor including the fluid dynamic bearing device as defined in claim 8, wherein the sleeve or the shaft is rotated as part of a rotor.

10. A motor including the fluid dynamic bearing device, as defined in claim 8, wherein when a temperature of working environment of the fluid dynamic bearing device is changed, the narrow gap for adjusting the thrust pressure is changed by a difference in linear expansion coefficient between the sleeve and the sleeve holder in such a direction that a thrust floating amount is adjusted, in response to changes in thrust pressure due to increases and decreases of a viscosity of the lubricant.

11. A motor including the fluid dynamic bearing device as defined in claim 7, wherein the sleeve or the shaft is rotated as part of a rotor.

* * * * *